United States Patent [19]

Nichols

[11] Patent Number: 4,959,152

[45] Date of Patent: Sep. 25, 1990

[54] HOLLOW FIBER SEPARATION MODULE AND METHOD FOR THE USE THEREOF

[75] Inventor: Randall W. Nichols, North Olmsted, Ohio

[73] Assignee: The Standard Oil Company, Cleveland, Ohio

[21] Appl. No.: 328,335

[22] Filed: Mar. 24, 1989

[51] Int. Cl.$^5$ ............................................. B01D 61/18
[52] U.S. Cl. ..................................... 210/651; 210/232; 210/321.79; 210/321.88; 210/500.23
[58] Field of Search .............. 210/232, 321.79, 321.88, 210/321.8, 500.23, 644, 651, 652; 55/16, 158

[56] References Cited

U.S. PATENT DOCUMENTS

| | | | |
|---|---|---|---|
| 3,207,311 | 9/1965 | Kasten | 210/137 |
| 3,216,572 | 11/1965 | Kasten | 210/97 |
| 3,223,240 | 12/1965 | Muller | 210/96 |
| 3,342,729 | 9/1967 | Strand | 210/500.28 X |
| 3,993,816 | 11/1976 | Baudet et al. | 428/45 |
| 4,225,439 | 9/1980 | Spranger | 210/321 |
| 4,592,839 | 6/1986 | Rosenburg | 210/352 |
| 4,659,549 | 4/1987 | Hamada et al. | 422/48 |
| 4,752,305 | 6/1988 | Johnson | 55/16 |

FOREIGN PATENT DOCUMENTS

| | | |
|---|---|---|
| 2650341 | 11/1978 | Fed. Rep. of Germany . |
| 2222134 | 3/1973 | France . |
| 54-78671 | 6/1979 | Japan . |

Primary Examiner—Frank Spear
Attorney, Agent, or Firm—Larry W. Evans; Joseph G. Curatolo; Sue E. Phillips

[57] ABSTRACT

Apparatus (60, 105, 115, 130, 150) for the separation of a fluid into permeate and retentate portions. Such apparatus provides a plurality of hollow fiber separation wafers (10), each wafer comprising a mat (25) of hollow fibers (18) arranged chord-wise of the wafer; and peripheral support means (11) encompassing the ends (19) of the hollow fibers and having inside (14) and outside (15) faces and upper (12) and lower (13) faces. The apparatus further includes vessel means (59, 121, 149) providing a first port (66, 132, 155) for receiving the fluid, a second port (69, 136, 158) for withdrawing the retentate and a third port (68, 135, 156) for withdrawing the permeate; means for compressing (73, 104, 111, 138, 161) the plurality of wafers in axial alignment; and permeate chamber means (71, 148, 164) within the vessel, separate from the feedstream and the retentate by the means for compressing and the support means. A method for the separation of fluid feedstreams into permeate and retentate portions includes the steps of feeding the fluid into a module containing a plurality of hollow fibers arranged chord-wise in parallel sheets, each sheet being oriented perpendicularly with respect to the longitudinal axis of the module; providing separate chambers for the permeate, communicating with the lumens of the hollow fibers, and for the retentate, communicating with the areas between the hollow fibers; and removing the permeate and retentate from the module.

29 Claims, 7 Drawing Sheets

HOLLOW FIBER SEPARATION MODULE AND METHOD FOR THE USE THEREOF

TECHNICAL FIELD

This invention relates generally to a separation apparatus, employing hollow fiber membranes for separating a fluid into permeate and retentate portions. More specifically, the invention relates to the use of a plurality of wafers coaxially disposed and compressed within a module having ports for admitting a fluid and for discharging the permeate and retentate portions of the fluid. Each wafer contains a plurality of hollow fiber membrane sheets, the hollow fibers of each sheet being arranged in parallel alignment which run chordwise across the wafer. The ends of each hollow fiber terminate at the exterior surface of the wafer, through which the permeate flows.

The module is useful in microfiltration applications and can be employed for the separation of gases, liquids and mixtures thereof, hereinafter referred to as liquid feedstreams. Thus, a variety of membrane materials can be selected from known compositions as well as new membrane compositions which are continually being developed. As will become more apparent hereinbelow, the wafers employ relatively short hollow fibers which are no greater in length than the diameter of the wafer which is, in turn, significantly less than the overall length of the separation module.

BACKGROUND OF THE INVENTION

The use of membranes in various forms for the separation of fluids to obtain a desired portion of the fluid is well known. Generally, one or several components of the feed fluid permeate through the membrane and are collected as the permeate portion. The portion of the fluid that cannot pass through the membrane, the retentate, is retained and discharged as fresh portions of the fluid to be separated are supplied to the membrane.

Membranes formed as hollow fibers or tubes are particularly useful because they are inherently strong to resist filtration pressures, they provide high surface area to volume ratios and, they can be readily arranged in various mechanical mountings. Conventional separation modules are configured as long cylinders with the hollow fibers arranged in an axial direction and terminated by plugs of potting material. One or both plugs are sliced to expose the open fiber ends and permit the flow of the permeate from the lumen of the tubular fiber.

In the existing devices, the fluid to be separated may be supplied to the outside of a fiber and the permeate may be collected from the lumen of the fiber. Alternatively, the fluid to be separated may be supplied to the lumen of the fiber and the permeate drained from outside of the fiber.

Hollow fiber membranes may be conveniently mounted in annular or similar frames or retainers having a continuous perimeter and an open central portion. The fibers are strung across the open central portion of the frame and the ends are embedded in the retainer thereby forming a wafer. The ends of the fibers are exposed at the outside surface of the retainer, giving access to the interior of the fibers, while the outside surfaces of the fibers are accessible in the open central portion of the retainer.

In order to obtain relatively high volume separation rates, membrane wafers are generally stacked coaxially so that the retainers bear on each other in sealing contact. Tight sealing of adjacent wafers is essential to avoid contamination of retentate and permeate. To achieve desirably high volume separation rates, the pressure of the fluid being subjected to the separation process is as large as possible. However, the fluid pressure is limited by the mechanical strength of the fibers, so that they are neither crushed nor ruptured, depending upon the direction of the pressure differential. The operating pressure is also limited by the fluid forces that tend to force the wafers apart, threatening the sealing engagement of adjacent wafer retainers.

Such membranes and corresponding separators incorporating the membranes are disclosed in various patents and applications. U.S. Pat. No. 3,993,816, for instance, describes an apparatus in which the interiors of the hollow fibers are connected to the exterior of the container so that either fluid permeate flows out of the apparatus or, in the event of fluid exchange, a second fluid flows in through the interiors of the fibers.

U.S. Pat. No. 4,752,305 provides a hollow fiber device for separating fluids and a related method. The device employs a bundle of fibers 11, oriented axially of the housing 10. The fluid feedstream is fed through the center of the bundle via distributor tube 12, one end of which is plugged. The permeate fluids flow out of each end, via outlets 39 and 40, while the retentate is drawn from outlet 35.

French Pat. No. 2,222,134 discloses a module separator wherein the wafers comprise a fabric placed in a tube perpendicular to the direction of flow so that the openings of the hollow fibers are located around the periphery.

Japanese Pat. No. 56-28031 discloses a hollow fiber membrane separator consisting of a hollow fiber tube plate formed by use of a synthetic resin which fixes and integrates the ends of the hollow tubes, and a channel for fluid flow outside of the hollow tubes. The tube plate is disposed such that the flow direction of the fluid outside of the tubes is perpendicular to the longitudinal axis of the hollow fiber tubes.

Finally, in German Pat. No. 2,650,341 a hollow fiber wafer is disclosed for use in a separator in which the hollow fibers are arranged in planes with an essentially non-parallel arrangement, essentially perpendicular to the flow direction of the substance to be separated.

While the aforementioned art discloses some of the ways in which hollow fiber wafers may be employed in a separator apparatus, it is nonetheless desirable to provide simple separation apparatus employing a plurality of hollow fiber membrane wafers in which the seals between adjacent wafers in the stack are maintained. Furthermore, it is desirable that the apparatus respond to changes in the fluid inlet pressure by altering the compression forces applied to the wafer stack to aid the sealing engagement of adjacent wafer retainers.

DISCLOSURE OF THE INVENTION

It is, therefore, an object of the present invention to provide a separation module containing a plurality of hollow fiber membrane wafers wherein the hollow fibers are arranged in layers and chord-wise of the wafer rather than axially of the module.

It is another object of the present invention to provide a separation module containing a plurality of hollow fiber membrane wafers that are compressed in axial alignment so that a fluid passing through the wafers is separated into a retentate portion and a permeate portion.

It is yet another object of the present invention to provide a separation module containing a plurality of hollow fiber membrane wafers, each wafer containing a plurality of layers of hollow fibers arranged in parallel sheets, said fibers being generally shorter than hollow fibers employed axially of the module in existing hollow fiber membrane separation devices.

It is another object of the present invention to provide a separation module which can be assembled in a variety of sizes from smaller wafers. Each wafer can be individually tested during assembly and can be readily removed should it fail during use.

It is still another object of the present invention to provide a method for the separation of fluids in a module employing hollow fiber membranes provided in a plurality of layers with the fibers oriented chord-wise of the module.

In general, the present invention provides apparatus for the separation of a fluid into permeate and retentate portions. It includes a plurality of hollow fiber separation wafers, each wafer comprising a mat of hollow fibers arranged chord-wise of the wafer and peripheral support means encompassing the ends of the hollow fibers and having inside and outside faces and upper and lower faces; vessel means providing a first port for receiving the fluid, a second port for withdrawing the retentate and a third port for withdrawing the permeate; means for compressing the plurality of wafers in axial alignment, and permeate chamber means within the vessel, separated from the feedstream and the retentate by the means for compressing the support means.

The present invention also provides a method for the separation of fluid feedstreams into permeate and retentate portions. The method includes the steps of providing a separate module having a feedstream inlet, a retentate chamber connected by a plurality of wafers in axial alignment and a permeate chamber. Each wafer comprises a mat of hollow fibers arranged chord-wise of the wafer and peripheral support means encompassing the ends of the hollow fibers. The remaining steps include directing the feedstream over the wafers; separating the feedstream into a permeate portion, which permeates the hollow fibers and flows through the peripheral support means into the permeate chamber, and a retentate portion, which passes around the hollow fibers and into the retentate chamber and finally, removing the permeate and the retentate from the module.

Another method for the separation of fluid feedstreams into permeate and retentate portions includes the steps of feeding the fluid into a module containing a plurality of hollow fibers arranged chord-wise in parallel sheets, each sheet being oriented perpendicularly to the longitudinal axis of the module; providing separate chambers for the permeate, communicating with the lumens of the hollow fibers, and for the retentate, communicating with the areas between the hollow fibers; and removing the permeate and retentate from the module.

These and other objects which shall become apparent to those skilled in the art are described in greater detail with reference to the drawings and specification which follows.

PREFERRED EMBODIMENTS FOR CARRYING OUT THE INVENTION

The basic component of the separation apparatus of the present invention is a cylinder, depicted in FIG. 1 and hereinafter referred to as a wafer 10. The wafer 10 comprises an outer annular potting ring 11 having upper and lower surfaces 12 and 13, respectively, an inner and outer cylindrical surfaces, 14 and 15, respectively. A plurality of layers 16 of hollow fibers 18 are stacked within each ring 11, the ends 19 of which are mounted within the ring 11 and terminate at the outer surface 15.

Figure 3A:
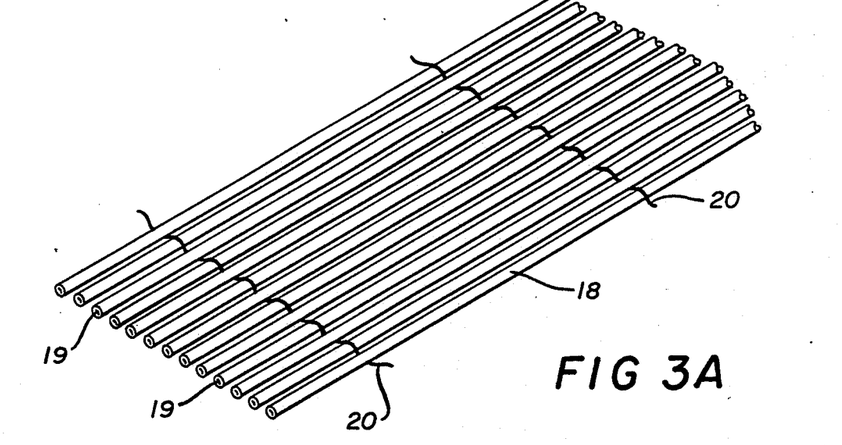

The construction of each layer 16 is preferably a woven mat of fibers with the hollow fibers 18 running parallel to one another in the woof direction and held together by filaments 20 in the warp direction, as depicted in FIG. 3A. The hollow fibers 18 are preferably woven by the warp filaments 20 which are a thinner, non-hollow fiber thread such as nylon, polyester or the like. The object is for each layer 16 to form a flat sheet and that the hollow fibers 18 be parallel and as straight as possible, not woven or twisted relative to the warp filaments 20.

Figures 1, 2, 3B, 3C:
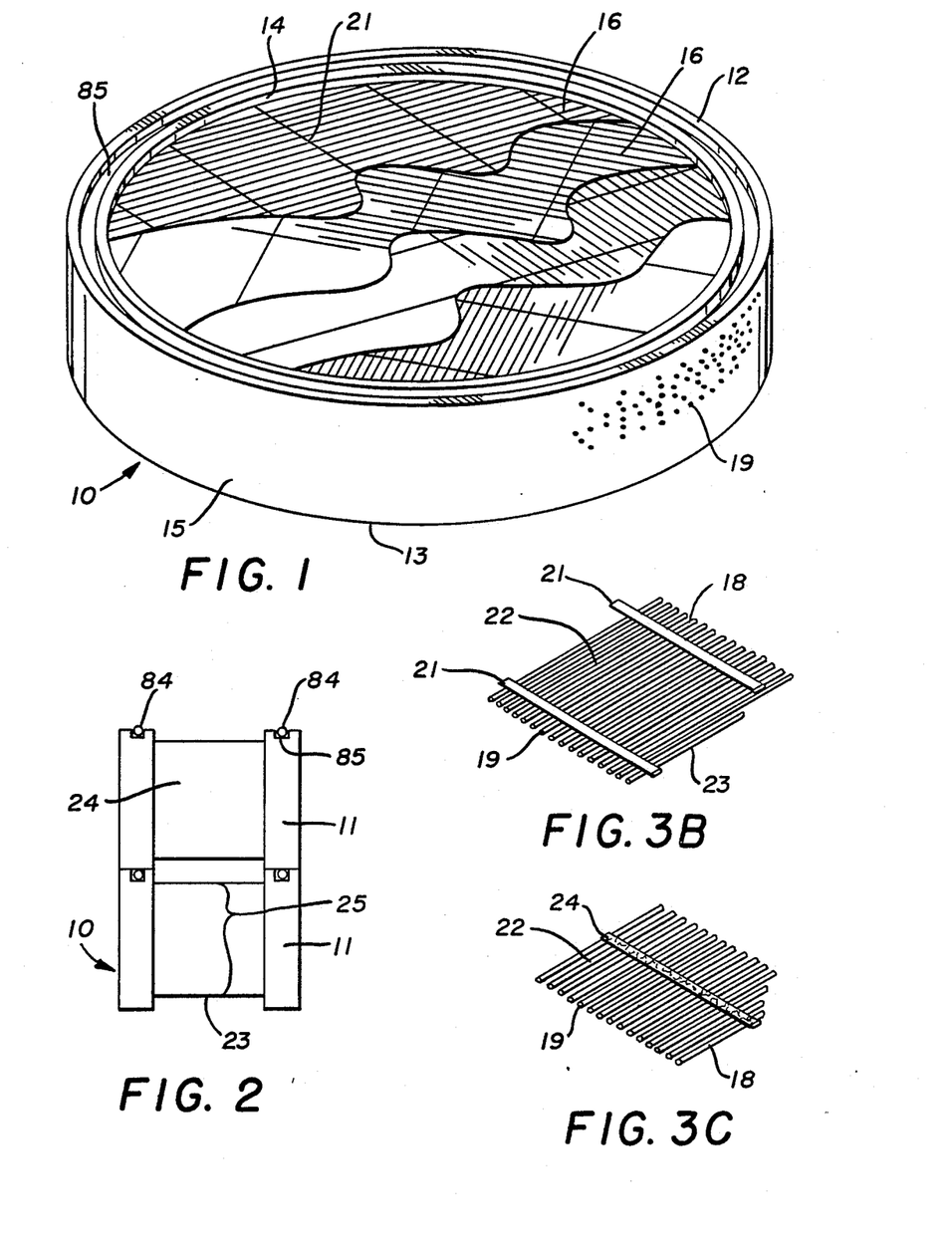
FIG. 1 is a perspective view of a wafer member of the present invention, partially broken away to show the individual hollow fiber layers.
FIG. 2 is a side elevation, partially in section, depicting the stacking of adjacent wafers.
FIGS. 3A-3C are perspective views of several hollow fibers taken from a layer of fibers and depicting alternative means by which they can be joined together to form a layer.

The hollow fibers of each layer 16 can also be affixed together with a suitable adhesive coated filament 21 on the upper or under sides 22 and 23, respectively, or both, of each layer 16, as depicted in FIG. 3B. Alternatively, a thin bead of adhesive 24 can be employed to tie the fibers 18 together, as depicted in FIG. 3C.

As should be apparent from the drawings, the hollow fibers 18 are arrayed chord-wise and the layers 16 are arranged either in parallel alignment or at cross-wise angles as depicted in FIG. 1 to provide a dense mat 25, through which a fluid, gas or liquid may flow axially. In operation, a feed stream is passed axially through the mat 25, i.e., through the wafer 10. As the fluid contacts the hollow fibers 18, some components pass through the hollow fiber 18 into the lumen and then flow out to the perimeter of the wafer where they (the permeate) are discharged from the open ends 19 of the fibers. Meanwhile, the retentate flow passes axially through the mat and wafer to be collected therebelow.

With respect to the composition of the hollow fibers, substantially any hollow fibers currently available, or which may subsequently become available, can be employed. Inasmuch as the composition and preparation of hollow fibers for the separation of a variety of gas mixtures and liquid mixtures, is well known to those skilled in the art, a detailed description thereof is not provided herein, it being understood that the present invention is not limited to any specific hollow fiber composition or method of preparation or fabrication.

Figure 4:
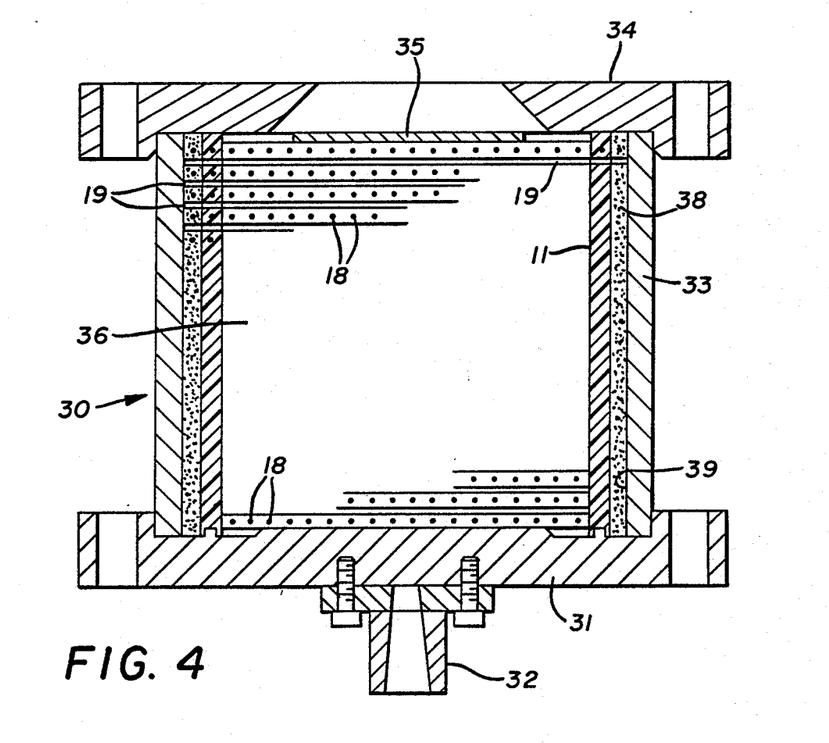
FIG. 4 is a side elevation, in cross-section, of a mold for fabricating the wafer member of the present invention and depicting the formation of a wafer therein.

The wafers 10 are manufactured by a potting technique utilizing a centrifuge. With reference to FIG. 4, a mold 30 is provided which comprises a bottom section 31, fastened to the spindle 32 of a centrifuge (not shown), a side mold section 33, a top mold section 34 and a slinger plate 35.

To fabricate a wafer, a plurality of hollow fiber layers 16 are cut to the dimension of the mold interior 36 and placed therein. The mold is then closed and rotated while a layer of resin such as a quick setting epoxy or wax or the like is poured onto the slinger plate 35. During rotation, the resin is cast centrifugally and, as is apparent from FIG. 4, the resin flows down through the layers of hollow fibers to become deposited in an annular ring 38 against the inner mold wall 39 which encompasses the ends of the fiber layers 16. Next, a potting resin is poured onto the slinger plate. It too is cast centrifugally and flows down through the layers of hollow fibers to form the annular ring 11 of the wafer, the outer diameter of which is defined by annular ring 38, while the inner diameter is formed by the amount of resin provided.

After the potting resin has set and the ring 11 has formed, the wafer 10 is removed from the mold 30. At this stage, the first annular ring 38 is removed by cutting, grinding or melting away flush with the outer circumferential edge 15 of ring 11. This leaves a plurality of hollow fiber ends entirely around the edge, some of which are perpendicular to the edge while others are angled or even parallel thereto. In this manner, all fiber ends 19 are open to the exterior of wafer 10.

Although not shown, it may be desirable to truncate the layer 16 along the opposite sides that are tangential to the ring 11 because they are otherwise not exposed to any feedstream material and hence wasted. Of course, the hollow fibers that are exposed within the ring 11 will extend through the ring 11 and open to the exterior face 15.

Figure 5:
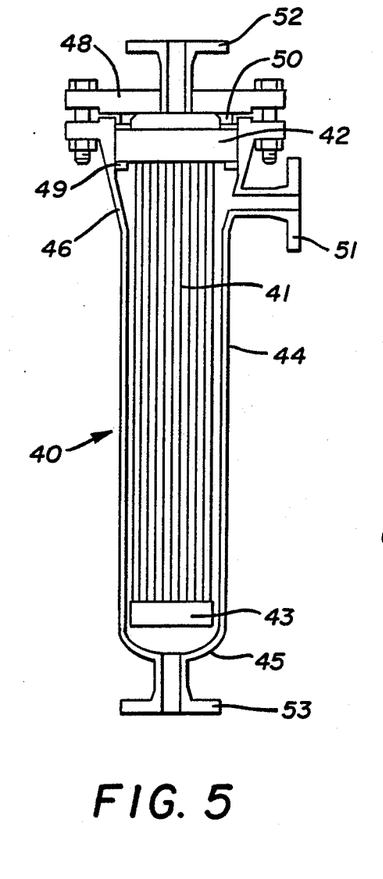
FIG. 5 is a side elevation, partially in section, of a hollow fiber separation module of the prior art.

An advantage attributable to the use of wafers 10 is their relatively short, chord-wise disposed fibers. Existing hollow fiber apparatus for separating fluid mixtures, employ long, axially disposed fibers within the apparatus or module, as is generally depicted in FIG. 5. Such modules, indicated by the numeral 40, employ a long, continuous bundle 41 of axially disposed fibers. The fibers terminate in flat, disc shaped upper and lower epoxy plugs or tubesheets 42 and 43, respectively, through which the fibers pass and terminate at one or both ends. The bundle is placed within a cylindrical housing 44, having a base 45, upper housing 46 and removable top 48. Typically, the upper housing 46 provides an inner flange 49, upon which the upper epoxy plug 42 is supported. The top 48 may also provide a flange 50 or similar structure engageable with the upper tubesheet 42 to hold the bundle 41 within the module 40.

A port 51, provided in the side of the upper housing is provided as an inlet for the feed stream. Permeate moves axially through the fibers and passes through a port 52 in the top while the retentate flows between the fibers and the port 53 at the base.

While this design is functional, the hollow fibers all terminate axially in the tubesheet 42. The tubesheets present flat surfaces perpendicular to the direction of the pressure differential between the feedstream fluid and the permeate fluid which are very weak to the resistance of pressure forces. Consequently, the diameter of the tubesheet is limited; the tubesheet must be made very thick, or the pressure differential must be limited. The equivalent of the tubesheet for the wafer design of the present invention is the potting ring 11 which is inherently stronger and resistant to the differential pressure forces within the module.

Although the hollow fibers 18 tend to weaken the potting ring 11 by passing therethrough, this effect can be minimized by orienting adjacent layers 16 at crosswise angles and also by truncating the layers, in which instance not as many fibers are passed through the ring 11.

Figure 6:
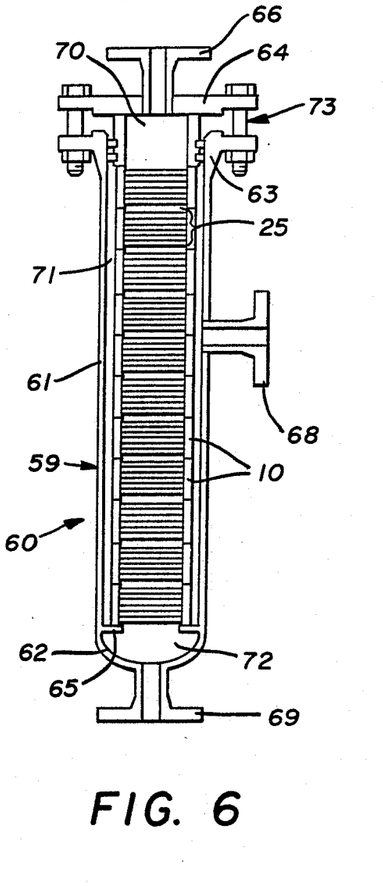
FIG. 6 is a side elevation, partially in section, of a hollow fiber separation module according to the present invention.

The module of the present invention is depicted for comparison in FIG. 6 and is indicated generally by the numeral 60. It employs a vessel 59 which comprises a cylindrical housing 61, base 62, upper housing 63 and removable top 64. Near the bottom of housing 61 a support shelf 65 is provided upon which the wafers 10 are stacked. Module 60 also provides feed, permeate and retentate ports 66, 68 and 69, respectively, as well as feedstream chamber 70, permeate chamber 71 and retentate chamber 72, which will be discussed hereinbelow. Finally, means for compressing the stack of wafers, referred to generally by the numeral 73, are provided. Several variations of the means 73 are depicted in FIGS. 7-11.

Figure 7:
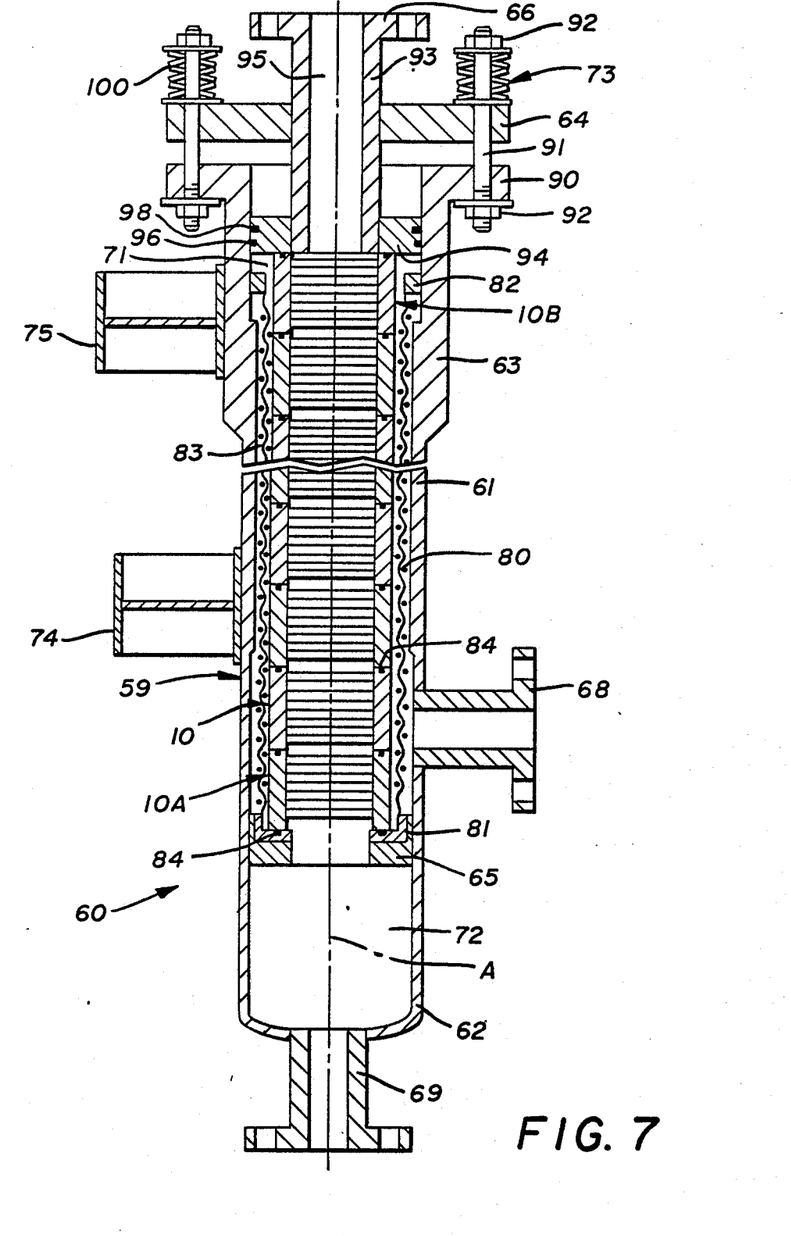
FIG. 7 is a cross-sectional side elevation depicting in greater detail a hollow fiber separation module according to the present invention.

With reference to FIG. 7, the module 60 is depicted in greater detail. The cylindrical housing 61 and base 62 and upper housing 63 are preferably constructed of steel or other metal such as stainless steel. Although they may be manufactured as separate components, they are joined together by welding or other suitable means to form a continuous one-piece module 60, to which the top 64 is affixed. The use of metal of proper thickness is desirable as a safeguard against catastrophic failure of one or more wafers. Saddles and 74 and 75 can be affixed to the housings 63 and 61 to mount the module 60 horizontally.

The wafers 10 are held within cage means 80 which comprises a first ring 81, which actually rests on support shelf 65 at the base, an upper centering ring 82, which fits within the permeate chamber 71 and housing means 63, and an open mesh body 83 that is generally cylindrical for receipt of the wafers 10 and connects the rings 81 and 82 together. The cage 80 not only facilitates insertion and removal of the wafers 10 but also aids in maintaining their axial alignment during assembly of the module 60.

During assembly and subsequent use of the module 60 it is important that the wafers 10 be sealed together to prevent the feedstream from passing between contiguous rings 11 and contaminating the permeate. As best depicted in FIG. 2, this is accomplished by fitting O-rings 84 into recesses 85 in the upper face 12 of each ring 10 as well as on cage ring 81 upon which the lowermost wafer 10A rests.

The wafers 10 are also sealed together by compression means 73 as shall be explained next. An outer flange 90 is part of upper housing member 63 to which the top 64 is affixed by studs 91, which pass through axially aligned bores in flange 90 and top 64, and nuts 92. Feed port 66 is welded or otherwise affixed within top 64 and provides a throat 93 which is affixed at its opposite end to a pusher plate 94. The feedstream (not shown) is fed into the port 66, through an inlet passageway 95, defined by the throat 93, and into contact with the uppermost wafer 10B. In this embodiment, no feedstream chamber is provided. The pusher plate carries at least one O-ring 96 and a metal piston ring 98 to seal the permeate chamber 71 and it rests against the uppermost wafer 10B. Use of a piston ring provides a safeguard where the module 60 is employed with flammable feedstreams. It should be evident that as the top 64 and flange 90 are joined together, the pusher plate 94 urges the stack of wafers firmly against support 65.

In order to accommodate differences in thermal expansion between the epoxy rings 11 of the wafers and the metal housing, a stack of Belleville washers 100 are located above the top 64 and under the uppermost nuts. The washers 100 bias the wafers together when they are partially compressed.

Figure 8:
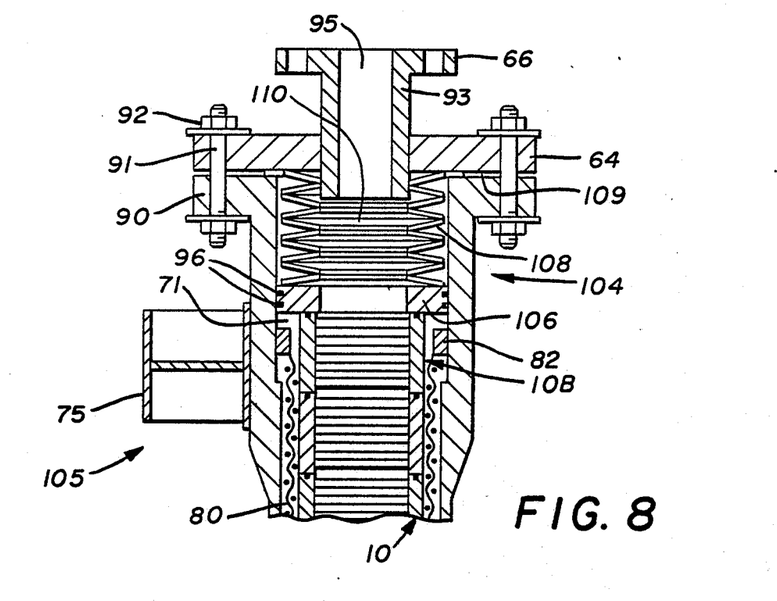
FIG. 8 is a cross-sectional side elevation of the upper portion of an alternative hollow fiber separation module, utilizing a standard piping seal, according to the present invention.

With reference to FIG. 8, an alternative embodiment is depicted by the module 105. Module 105 is essentially identical to module 60 with the exception of the compression means 104 and related upper module components. First, while the throat 93 of port 66 is rigidly affixed to the top 64, it is separately movable with respect to pusher plate 106. Next, a stack of larger Belleville washers 108 is employed between the pusher plate 106 and top 64. In this embodiment a metallic gasket or the like 109 is employed between the top 64 and flange 90 to provide the main seal therebetween. Hence, the pusher plate 106 is provided with O-rings 96. In module 105 a separate feedstream chamber 110 is provided between the inlet passageway 95 and wafers 10. In addition to the force exerted by the Belleville washers, the pressure of the feedstream also exerts an axial force on the wafers 10.

Figure 9:
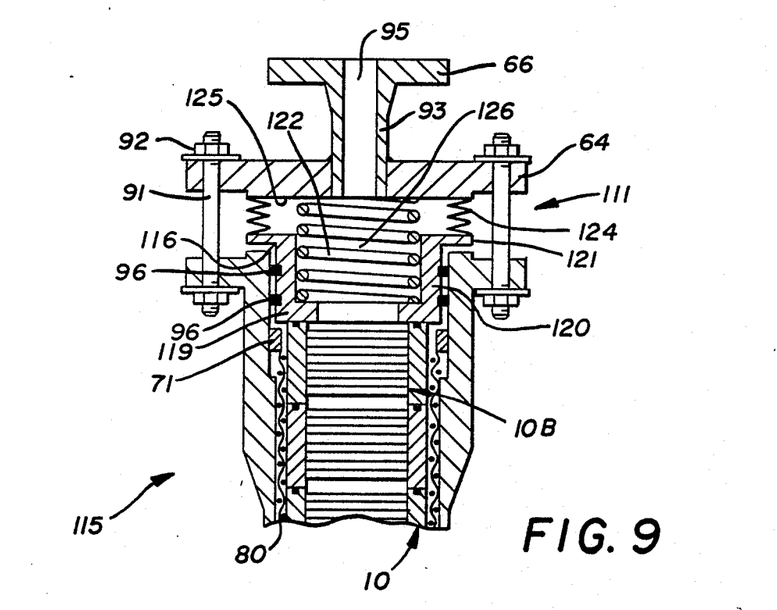
FIG. 9 is a cross-sectional side elevation of the upper portion of an alternative hollow fiber separation module, utilizing a bellows seal, according to the present invention.

An alternative means for sealing the module 115 and the wafers therein is depicted in FIG. 9. Module 115 is again similar to module 60 with the exception of the compression means 111 and related upper module components. This module employs a compression ring 116, rather than a pressure plate, which contains O-rings 96 to seal within permeate chamber 71. Compression ring 116 comprises a base 119 and cylindrical sidewall forming a neck 120 and a radially outwardly extending flange 121 therefrom. The feed port 66 is again joined to the top 64 but does communicate directly with the compression ring 116. A compression spring 122 is received within the compression ring 116 and urges the base 119 against the uppermost wafer 10B as the top 64 is bolted down.

A bellows seal 124 is affixed to the underside 125 of top 64 and the flange 121 of compression ring 116 to enclose a separate feedstream chamber 126 between the passageway 95 and wafers 10. Feedstream fluid exerts pressure on the flange 121 which acts a larger diameter piston urging downward pressure on the wafers.

Although the modules 60, 105 and 115, described herein, have been designed for high pressure uses, encountered during the separation of gaseous feedstreams, a modified vessel can be employed for the separation of liquids as well as gases, wherein lower pressures are usually the norm. Two such designs are provided in FIGS. 10 and 11 to which reference should now be made.

Figure 10:
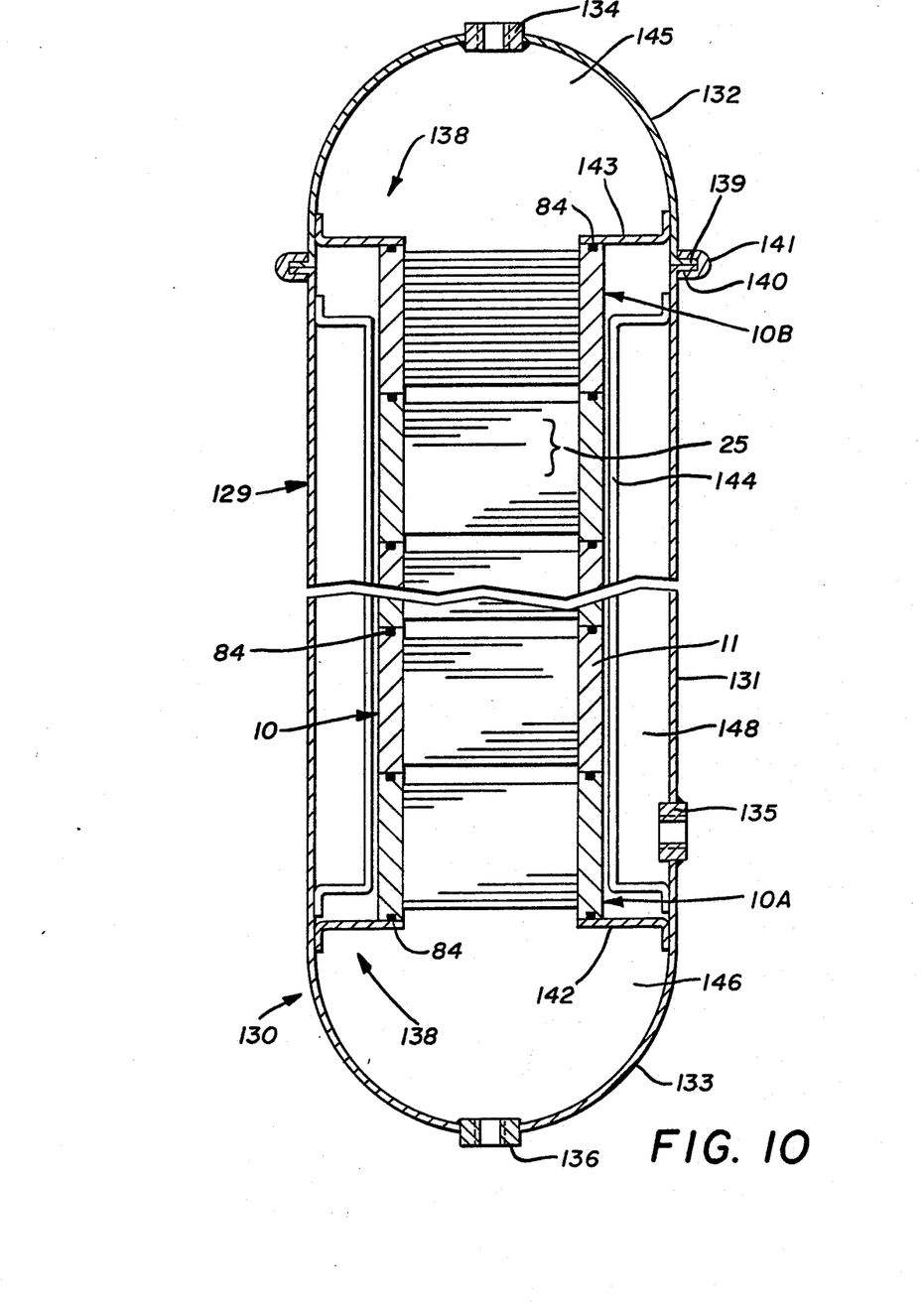
FIG. 10 is a cross-sectional side elevation of an alternative hollow fiber separation module, intended for light weight service, according to the present invention.

The module in FIG. 10, referred to generally by the numeral 130, employs a vessel 129 which comprises a cylindrical housing 131, and hemispherical end caps 132 and 133. The components 131-133 are generally thin-walled and can be made out of metal or fiber reinforced plastics. Threaded bosses 134, 135 and 136 are provided as feed, permeate and retentate ports, respectively. Compression means, indicated generally by the numeral 138, are provided within module 130, as described hereinbelow.

The lower end cap 133 can be fabricated as part of the housing 131 or it can be separately fabricated and affixed thereto as is the upper end cap 132. Upper end cap 132, in turn, is provided with an external flange 139, which mates with an external flange 140 provided at the end of housing 131. These two flanges are joined with a suitable mechanical clamping device 141.

Compression means 138 includes a first, bevelled pressure ring 142 is affixed in a suitable manner such as welding, riveting or the like. The ring 142 forms a base upon which a stack of individual wafers 10 is placed. A second, bevelled pressure ring 143 is a component of compression means 138 and is located in similar fashion within the upper end cap 132. Both rings 142 and 143 are inclined toward each other during rest. However, when the wafers 10 are present and the module 130 is assembled, the rings 142 and 143 are urged apart and, therefore, provide a compressive force against the wafers, keeping them together. A plurality of guide rods 144 are optionally affixed within housing member 131 and serve to center the wafers 10 within the module 130 during assembly. O-rings 84 are provided between the wafers 10, as described hereinabove.

The design of module 130 provides a lightweight module that can be employed where weight is of consideration such as on board an aircraft. As one example of use, air could be fed through the feed port 134 and separated by the wafers into oxygen and nitrogen. Oxygen, the permeate, could be supplied for breathing, while nitrogen, the retentate could be utilized as a blanket over the fuel. The module 130 has in common with the foregoing modules 60 the use of a plurality of wafers 10. The advantage of this construction is that any given wafer that might fail prematurely can be readily replaced by a new wafer.

As should be apparent from the drawing, the feedstream chamber 145 is defined by the upper end cap 132, the pressure ring 143 and the uppermost wafer 10B. Similarly, the retentate chamber 146 is defined by the lower end cap 133, the pressure ring 142 and the lowermost wafer 10A. The permeate chamber 148 resides between chambers 145 and 146, and is defined by the housing walls and the annular rings 11 of wafers 10.

Figure 11:
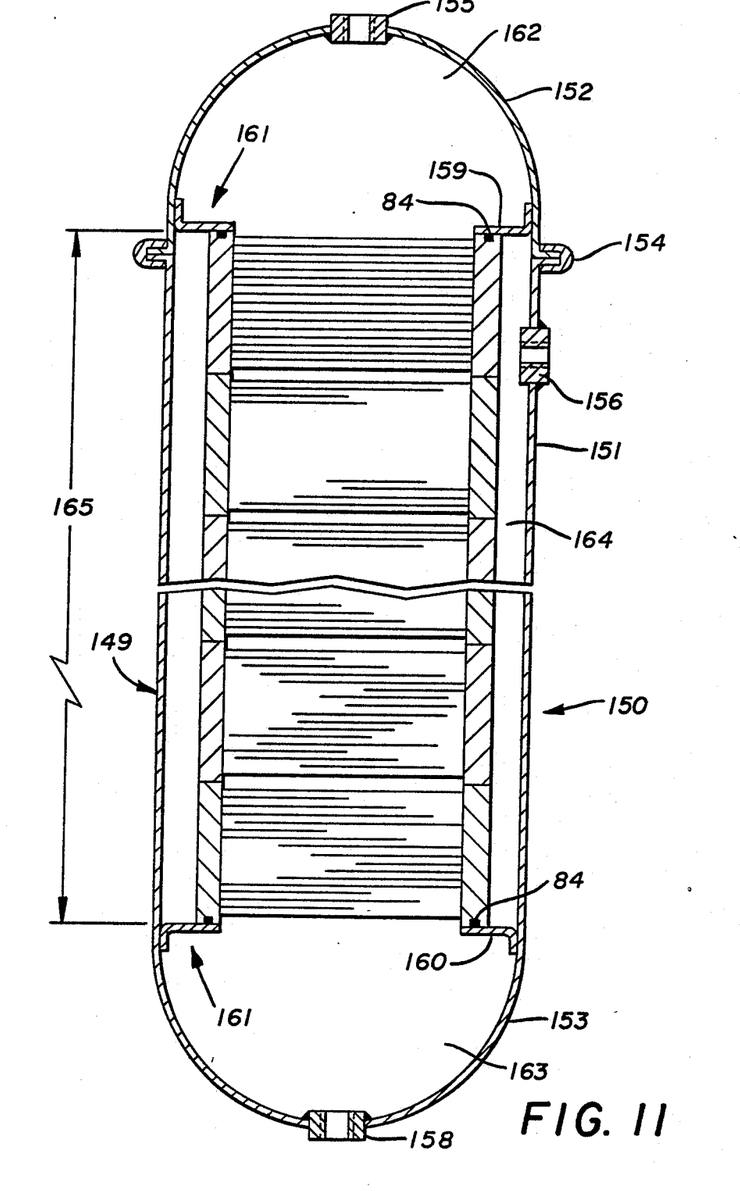
FIG. 11 is a cross-sectional side elevation of another alternative hollow fiber separation module, intended for disposable element service, according to the present invention.

While this design reflects considerable savings over the existing modules employing axial hollow fibers, it may be desirable to provide a disposable module. The module 150 depicted in FIG. 11 provides such a design. It employs a vessel 149 which includes a cylindrical housing 151; upper and lower end caps 152 and 153, respectively, clamp ring 154, feed, permeate and retentate ports, 155, 156 and 158, respectively and upper and lower pressure rings 159 and 160, respectively, which comprise the compression means 161. The module 150 also includes feedstream, retentate and permeate chambers 162, 163 and 164, respectively, comparable to those described in conjunction with module 130.

The fiber stack, referred to by the numeral 165, comprises a plurality of individual wafers 10 which have been secured together by a suitable adhesive (not shown) applied between adjacent faces.

During construction of the module 150, each wafer 10 is individually tested and then added to the stack 165. O-rings can be deleted from between the wafers, as they will be adhered together. Once inside the module 150, the module can be operated until permeate flow becomes contaminated or is too low, then the entire module can be discarded or, in the alternative, the stack 165 can be removed and replaced by a new one.

As should now be apparent, the modules of the present invention employ a stack of individual wafers which contain hollow fibers oriented chord-wise. Because fluid flow pressure losses of the permeate in the fiber lumen are detrimental to the performance of hollow fiber modules, the longer the fiber, the more performance is adversely affected. Thus, a specific improvement in the performance of the module design of the present invention over existing modules employing axial fibers is obtained by the use of the shorter, chord-wise fibers.

The present invention also provides a method for the separation of fluid feedstreams into permeate and retentate portions. As noted hereinabove, the fluid that can be separated can include gaseous mixtures or liquid mixtures. For purposes of discussion, the module 60 in FIG. 7 can be considered although it is to be understood that the method can be practiced with any of the other modules, 105, 115, 130 and 150, depicted in FIGS. 8-11.

The fluid feedstream, gas or liquid, is fed to the module 60 via port 66 into the inlet passageway 95. The module provides a plurality of wafers 10 which separate the feedstream passageway 95 at one end, from the retentate chamber 72, at the opposite end. The wafers 10 are arranged axially as individual units, compressed together in the module 60 and the like or affixed to one another with a suitable adhesive as in the module 150.

The fluid is directed from the inlet passageway through the wafers and over each sheet of hollow fibers. As should be apparent from the foregoing disclosure, each sheet of fibers is oriented perpendicularly to the longitudinal axis A of the module. Within each wafer, the permeable portion of the fluid enters the hollow fibers and flows through the lumens thereof and through the peripheral support of the wafer to enter the permeate chamber 71. The latter is formed between the walls of the module and the coaxially aligned supports 11 of the wafers. In this step the fluid becomes separated into permeate and retentate portions which are ultimately removed from the module.

In order to demonstrate such use, a test module was fabricated and employed for the separation of propylene from propane and established operability of the wafers and the module.

Based upon the foregoing description and examples, it should be apparent that the modules and wafers disclosed herein fulfill the objects of the present invention. The modular nature of the individual wafers allows chord-wise modules of almost any length to be assembled from one size of wafer, merely by adding wafers to the stack. Many different module configurations can be assembled with only a few different wafer diameters. Moreover, wafers can be tested individually prior to assembly of the module and thus, defective wafers can be removed from a module and discarded with less loss of hollow fibers, than where an entire axial fiber module must be replaced.

Another important feature of the present invention which should be apparent is the alternative means possible for providing a compressive loading of the wafers within the module. The various embodiments depicted each provide more uniform compression and sealing of the wafers which can accommodate dimensional changes due to pressure and temperature variations.

Thus, it should be clear to those skilled in the art the manner in which the hollow fiber separation modules described herein are constructed, assembled and used. Based upon the foregoing disclosure, it should also be apparent that the use of the modules described herein will carry out of the objects set forth hereinabove. It will also be apparent to those skilled in the art that the modules of the subject invention can readily be utilized in conjunction with various types of feedstream separations.

It is to be understood that any variations evident fall within the scope of the claimed invention; therefore, the selection of specific component elements can be determined without departing from the spirit of the invention herein disclosed and described. Moreover, the scope of the invention shall include all modifications and variations that may fall within the scope of the attached claims.

I claim:

1. Apparatus for the separation of fluid into permeate and retentate portions comprising:
    a plurality of hollow fiber separation wafers for the separation of said fluid passing axially therethrough, each said wafer comprising
        a mat of hollow fibers arranged chord-wise of said wafer and in a plurality of flat, continuous layers, each said layer having a plurality of straight hollow fibers in adjacent, parallel alignment with axial flow space therebetween; and
        continuous peripheral support means encompassing the ends of said hollow fibers and having inside and outside faces and upper and lower faces;
    vessel means providing a first port for receiving said fluid, a second port for withdrawing said retentate and a third port for withdrawing said permeate;
    means for compressing said plurality of wafers in axial alignment and acting against said support means; and
    permeate chamber means within said vessel, separated from said feedstream and said retentate by said means for compressing and said support means.

2. Apparatus, as set forth in claim 1, wherein said layers are arranged so that said hollow fibers of at least some layers lie at a cross-wise angle to adjacent layers of said hollow fibers.

3. Apparatus, as set forth in claim 2, further comprising:
feedstream inlet passageway means within said first port and communicating with said mat of hollow fibers within said inside faces of said support means; and
retentate chamber means downstream of said feedstream passageway means and in communication with said second port and said mat of hollow fibers within said inside faces of said support means, wherein said permeate enters said hollow fibers and flows through said support means into said permeate chamber means.

4. Apparatus, as set forth in claim 1, wherein said vessel means includes
elongate body means, closed at one end, and internal shelf means for receiving and supporting said plurality of wafers in axial alignment; and
end cap means, removably affixed to the opposite end of said elongate body means, said first port being affixed to said end cap means.

5. Apparatus, as set forth in claim 4, wherein said means for compressing includes
pusher plate means affixed to said first port, communicable with the first of said plurality of wafers in axial alignment; and
spring means urging said end cap and said pusher plate means against said first of said wafers.

6. Apparatus, as set forth in claim 5, further comprising:
cage means locatable within said vessel means and having a first ring supportable by said internal shelf means, a second ring for centering said cage means within said elongate body means and an open mesh body member therebetween for receipt of said plurality of wafers.

7. Apparatus, as set forth in claim 4, further comprising:
feedstream chamber means in communication with said first port and said mat of hollow fibers within said inside faces of said support means; and
retentate chamber means downstream of said feedstream chamber means and in communication with said second port and said mat of hollow fibers within said inside faces of said support means, wherein said permeate enters said hollow fibers and flows through said support means into said permeate chamber means.

8. Apparatus, as set forth in claim 7, wherein said first port means is carried by said end cap means and provides throat means extending into said feedstream chamber.

9. Apparatus, as set forth in claim 4, wherein said means for compressing includes
pusher plate means communicable with the first of said plurality of wafers in axial alignment; and
spring means urging said pusher plate means away from said end cap means and against said first of said wafers.

10. Apparatus, as set forth in claim 9, further comprising:
cage means locatable within said vessel means and having a first ring supportable by said internal shelf means, a second ring for centering said cage means within said elongate body means and an open mesh body member therebetween for receipt of said plurality of wafers.

11. Apparatus, as set forth in claim 4, wherein said means for compressing includes
compression plate means communicable with the first of said plurality of wafers in axial alignment; and
spring means urging said compression plate means away from said end cap means and against said first of said wafers.

12. Apparatus, as set forth in claim 11, wherein said compression plate means includes
a base engageable with said support means of the first of said plurality of wafers;
neck means extending from said base opposite said wafers; and
external flange means carried by said neck means at the opposite end thereof and extending outwardly relative to said base.

13. Apparatus, as set forth in claim 12, wherein said compression plate means moves independently of said end cap means.

14. Apparatus, as set forth in claim 13, further comprising:
bellows means forming an expandable seal between said external flange means and said end cap means defining said feedstream chamber.

15. Apparatus, as set forth in claim 14, further comprising:
cage means locatable within said vessel means and having a first ring supportable by said internal shelf means, a second ring for centering said cage means within said elongate body means and an open mesh body member therebetween for receipt of said plurality of wafers.

16. Apparatus, as set forth in claim 1, wherein said vessel means includes
elongate body means, closed at one end; and
end cap means, removably affixed to the opposite end of said elongate body means.

17. Apparatus, as set forth in claim 16, wherein said means for compressing includes
first and second opposed pressure rings rigidly affixed at their peripheral edge within said vessel means and resiliently movable away from each other by said plurality of wafers in axial alignment.

18. A method for the separation of fluid feedstreams into permeate and retentate portions comprising the steps of:
providing a separate module having a feedstream inlet and a retentate chamber, connected by a plurality of wafers in axial alignment, each said wafer comprising
a mat of hollow fibers arranged chord-wise of said wafer and in a plurality of flat layers, each said layer having a plurality of straight hollow fibers in adjacent, parallel alignment with axial flow space therebetween; and
continuous peripheral support means encompassing the ends of said hollow fibers;
directing said feedstream through said feedstream inlet over said wafers and axially therethrough;
separating said feedstream into a permeate portion, which permeates said hollow fibers and flows radially through said peripheral support means into said permeate chamber, and a retentate portion, which passes around said hollow fibers and axially into said retentate chamber; and removing said permeate and said retentate from said module.

19. A method, as set forth in claim 18, including the further step of compressing said wafers thereby preventing said feedstream and said retentate from passing between said peripheral support means of adjacent wafers.

20. A method, as set forth in claim 19, including the additional step of providing an inlet port; a closure plate for said separation module and a pusher plate, communicable with the first of said plurality of wafers; said inlet port closure plate and pusher plate being rigidly affixed together.

21. A method, as set forth in claim 20, wherein said step of compressing includes the step of urging said pusher plate against said first of said plurality of wafers.

22. A method, as set forth in claim 19, including the additional step of directing said feedstream into an inlet chamber.

23. A method, as set forth in claim 22, including the additional step of providing an inlet port, communicable with said feedstream chamber; a closure plate for said separation module, movable with said inlet port and, a pusher plate separately movable with respect to said inlet port.

24. A method, as set forth in claim 23, wherein said step of compressing includes the step of urging said pusher plate against the first of said plurality of wafers.

25. A method, as set forth in claim 22, further comprising the step of providing an inlet port, communicable with said feedstream chamber; a closure plate for said separation module rigidly affixed to said inlet port; compression plate means communicable with the first of said plurality of wafers and, bellows means interposed between said closure plate and said compression plate means.

26. A method, as set forth in claim 25, wherein said step of compressing includes the step of urging said compression plate means against said first of said plurality of wafers.

27. A method, as set forth in claim 22, further comprising the step of providing an inlet port communicable with said feedstream chamber and compression means communicable with said wafers.

28. A method, as set forth in claim 27, wherein said step of compressing includes the step of urging said compression means against said wafers.

29. A method for the separation of fluid feedstreams into permeate and retentate portions comprising the steps of:
  feeding said fluid into and axially through a module containing a plurality of wafers, each said wafer comprising
  a mat of hollow fibers arranged chord-wise of said wafer and in a plurality of flat, continuous parallel sheets, each said sheet having a plurality of straight hollow fibers in adjacent, parallel alignment with axial flow space between adjacent fibers, each said sheet being oriented perpendicularly with respect to the longitudinal axis of said module;
  providing separate chambers for said permeate, communicating with the lumens of said hollow fibers, and for said retentate, communicating with the area between said hollow fibers; and
  removing said permeate radially and said retentate axially from said module.

* * * * *